(12) United States Patent
Acton et al.

(10) Patent No.: US 7,431,548 B2
(45) Date of Patent: Oct. 7, 2008

(54) APPARATUS AND METHOD FOR HOUSING A RESTRAINT DEVICE

(75) Inventors: Aaron Acton, Whitestown, IN (US); Jeffrey A. King, Markleville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 11/345,423

(22) Filed: Feb. 1, 2006

(65) Prior Publication Data

US 2006/0210371 A1    Sep. 21, 2006

Related U.S. Application Data

(60) Provisional application No. 60/649,919, filed on Feb. 3, 2005.

(51) Int. Cl.
*B60P 7/08*   (2006.01)

(52) U.S. Cl. ............... 410/103; 410/107; 410/111; 410/112

(58) Field of Classification Search ............. 410/12, 410/97, 102–103, 106–107, 109, 110, 111, 410/112, 113, 116, 72, 73; 248/499; 105/355; 154/213
See application file for complete search history.

(56) References Cited

U.S. PATENT DOCUMENTS

| 3,508,502 | A | * | 4/1970 | Sims | 410/103 |
| 6,872,037 | B2 | * | 3/2005 | Girardin | 410/12 |
| 2001/0031187 | A1 | * | 10/2001 | Goham et al. | 410/106 |

* cited by examiner

*Primary Examiner*—Stephen Gordon
(74) *Attorney, Agent, or Firm*—Barnes & Thornburg LLP

(57) ABSTRACT

A housing assembly for housing a restraint device is provided. The housing assembly may be recessed into a floor or a wall of a building or a vehicle. The restraint device may be a retractor.

9 Claims, 6 Drawing Sheets

APPARATUS AND METHOD FOR HOUSING A RESTRAINT DEVICE

This application claims priority to and the benefit of U.S. Provisional Patent Application No. 60/649,919, filed 3 Feb. 2005, the disclosure of which is now expressly incorporated herein by reference.

FIELD OF THE INVENTION

This invention relates generally to retractable tie-down assemblies that enable an item, such as some type of cargo, to be secured to a platform such as a trailer. Specifically, the present invention relates to retractable tie-down assemblies that are mounted in a housing assembly.

BACKGROUND OF THE INVENTION

Various restraint devices or tie-down devices or assemblies for use with items such as cargo are known. For example, one known pertinent prior art is commonly owned U.S. Pat. No. 5,282,706, the disclosure of which is incorporated herein by reference. Such tie-down assemblies include a locking mode to prevent a spool of the assembly from being rotated in either a pay-out direction or a retracting direction and free-spooling mode. In addition, such a tie-down assembly may have an incremental or ratcheting mode of tightening.

Tie-down assemblies may remain fastened to a platform such as a platform on a trailer, boat or ferry, truck, a car carrier, or on an airplane cargo hold, for example, at all times. Tie-down assemblies may be used to secure various cargo items or boxes onto the platform, car carrier, cargo hold, etc. They may also be used in vehicles such as buses to secure or retain some item such as cargo, passengers, wheel chairs and the like. The tie-down assemblies or restraint devices may be mounted directly to a structure such as a post, a frame, a floor or a wall of for example a vehicle or building. It is desired to have such a restraint device to be mounted in a protected and/or recessed position as disclosed herein.

SUMMARY OF THE INVENTION

The present invention comprises one or more of the features identified in the various claims appended to this application and combinations of such features, as well as one or more of the following features or combinations thereof.

A housing assembly generally comprises a storage cover and a storage chamber. The storage cover and storage chamber may be moveably coupled together to define an axis about which the storage cover moves. Illustratively, such movement may be rotational or may be a pivot movement. The axis may be a transverse axis or a longitudinal axis. Further, the axis may be defined at a central or middle location between the ends or sides of the storage cover, or it may be defined at one of the ends or sides of the storage cover. The storage cover may also have a split construction such that it opens down the middle. The restraint device may be mounted to the storage cover. The housing assembly may further comprise a mounting plate separate from the storage cover. The separate mounting plate may be moveably mounted to the storage chamber. The separate mounting plate may be co-axially mounted, or may be separately mounted, and may move in concert or independently of the storage cover. The restraint device may be mounted to the mounting plate. The housing assembly may be mounted in a recess in a support structure such as a wall or a floor. The wall or floor may be a support structure of for example and without limitation a building, a vehicle, a trailer and the like. Illustratively, the housing assembly is mounted flush with the surface of the support structure. The housing assembly may have a flange or skirt to facilitate the mounting of the housing assembly. The housing assembly may be made of any suitable material using any method of manufacture suitable to the material(s) being used. The storage cover and/or the storage chamber may be of monolithic construction, or may be made from component parts.

These and other aspects of the present invention will become more apparent from the following description of the illustrative embodiments and claims appended hereto.

DESCRIPTION OF THE ILLUSTRATIVE EMBODIMENTS

Figure 1:
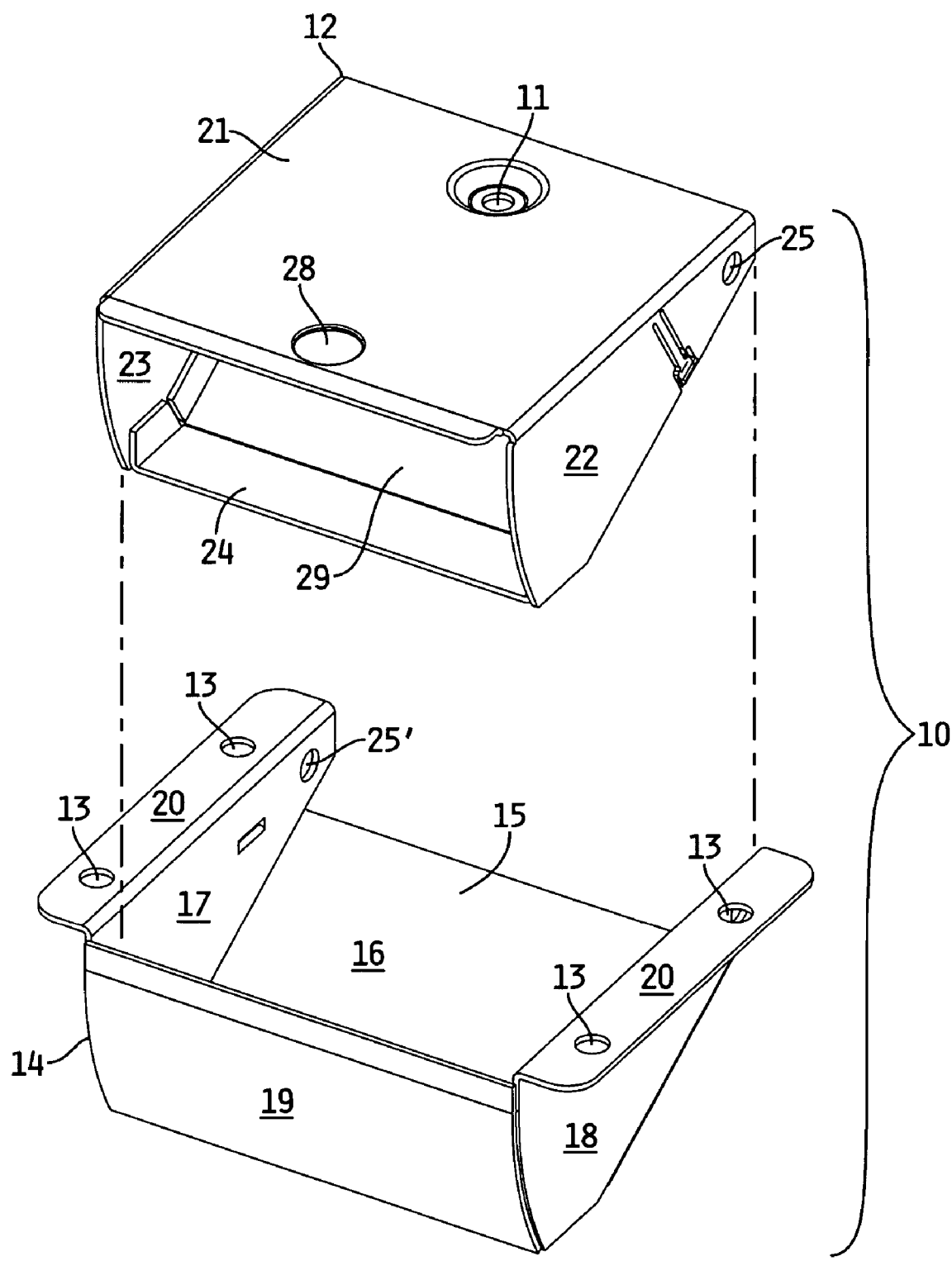
FIG. 1 is an exploded view of an illustrative housing assembly.

For the purposes of promoting an understanding of the principles of the invention, reference will now be made to a number of illustrative embodiments illustrated in the drawings in which like numerals are employed to designate like parts throughout and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, an exploded view of an illustrative housing assembly 10 is shown. The housing assembly 10 comprises a storage cover 12 and a storage chamber 14. The storage cover 12 generally comprises a base wall 21 having opposing sides and opposing ends and a pair of spaced-apart sidewalls 22, 23 proximate to the opposing sides of the cover 12, with the base wall 21 extending transversely between the sidewalls 22, 23. A cross-piece 24 may also extend transversely between the sidewalls 22, 23 at one of the ends as seen in FIG. 1. An aperture or cavity 29 is defined by the sidewalls 22, 23 and the base wall 21. A mounting aperture 11 may be formed in the base wall 21, illustratively at the end distal from the cross-piece. The mounting aperture 11 may be used to attach or mount a restraint device 40 to the storage cover 12 and base wall 21. The storage cover 12 may also have a manipulator 28, which illustratively is positioned at the proximate end of the cover 12 or base wall 21, generally centered between the cover's sides. The manipulator 28 may be used to facilitate movement of the cover 12 relative to the storage chamber 14 as will be discussed. Illustratively, the sidewalls 22, 23 have a generally triangular shape tapering from their respective base ends that are proximate to the cross-piece 24 down to their respective apex ends that are distal from the cross-piece. Of course the sidewalls 22, 23 could have any suitable shape. Illustratively, coupling or mounting apertures 25 may be formed in the sidewalls 22, 23 at their respective distal ends. The storage cover 12 may but need not be monolithic or manufactured out of a single piece of material such that the sidewalls 22, 23 are formed by turning a portion of the base 21 wall upwardly or downwardly away from the base wall 21. It will be appreciated that in addition to, or in lieu of the cross-piece 24, the storage cover 12 may be fashioned with either a front wall (not shown) and/or a back wall (not shown) sandwiched between and generally perpendicular to sidewalls 22, 23. So too, the storage cover may comprise a base wall alone, or a base wall with slightly turned up edges. The storage lid or cover 12 illustratively has but need not have a quadrilateral shape in plan view. It will be appreciated that any regular or irregular shape may be used.

Illustratively, the storage chamber 14 may be configured to receive therein a restraint device 40 and the storage chamber 14 generally comprises a pair of spaced-apart sidewalls 17, 18 and a base wall 16 extending transversely therebetween. Another end or cross wall 19 may also extend transversely between the sidewalls 17, 18 at the forward or proximal end of the storage chamber 14. A storage cavity or recess 15 is defined between the walls 17, 18, 19 and the base wall 16. Illustratively, the sidewalls 17, 18 may have a flange or skirt 20, as may the end or cross wall 19. In addition, another end or cross wall or cross piece (not shown) may extend between the sidewalls 17, 18 opposite the cross wall 19 at the rear or distal end of the storage chamber 14, and such another end or cross wall may but need not have a flange or skirt 20. Mounting apertures 13, may be formed in the skirt 20 and may be configured to receive therethrough any suitable connector or coupler to mount the assembly 10 in a floor or wall or other support structure. The storage chamber 14 may be recessed in the support structure. The sidewalls 17, 18 illustratively have a generally triangular shape tapering from their respective base ends that are proximate to the end or cross wall 19 down to their respective apex ends that are distal from the cross wall. In the depicted embodiment, therefore, the storage cavity or recess tapers from the deep or proximate end to the shallow or distal end and is sized to receive and snuggle therein the storage cover 12. Of course the sidewalls 17, 18 could have any suitable shape. The illustrative sidewalls 17 and 18 each have formed through their respective distal ends a mounting aperture 25'.

Figure 2:
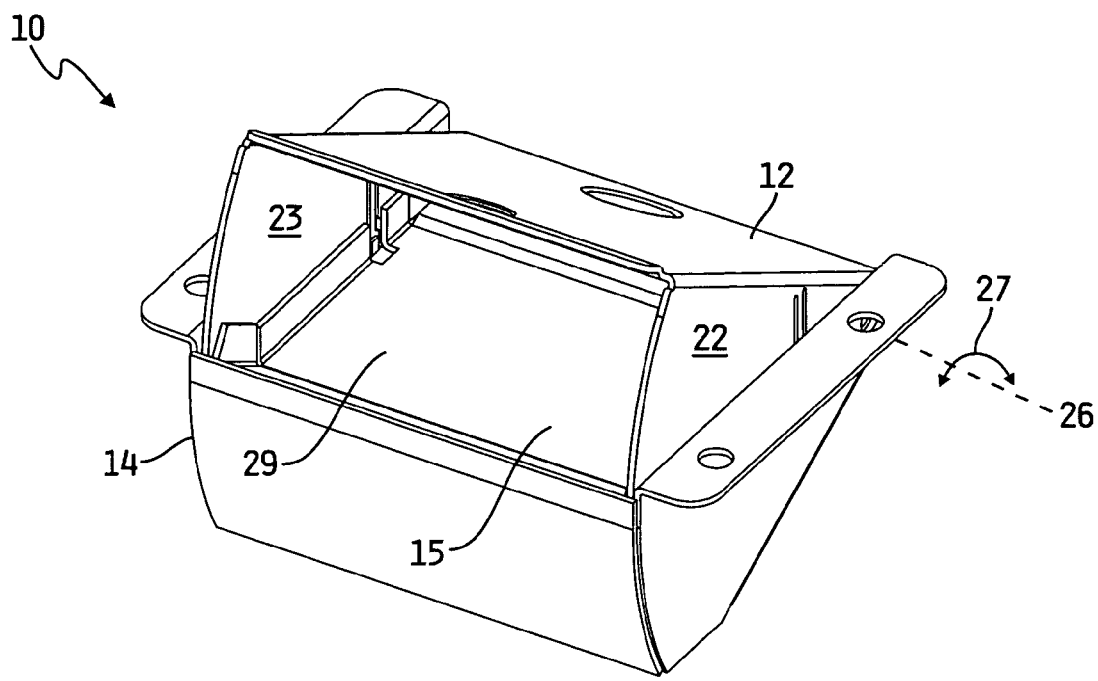
FIG. 2 is a perspective view of the illustrative housing assembly of FIG. 1 showing the storage cover in a partially open position.
Figure 3:
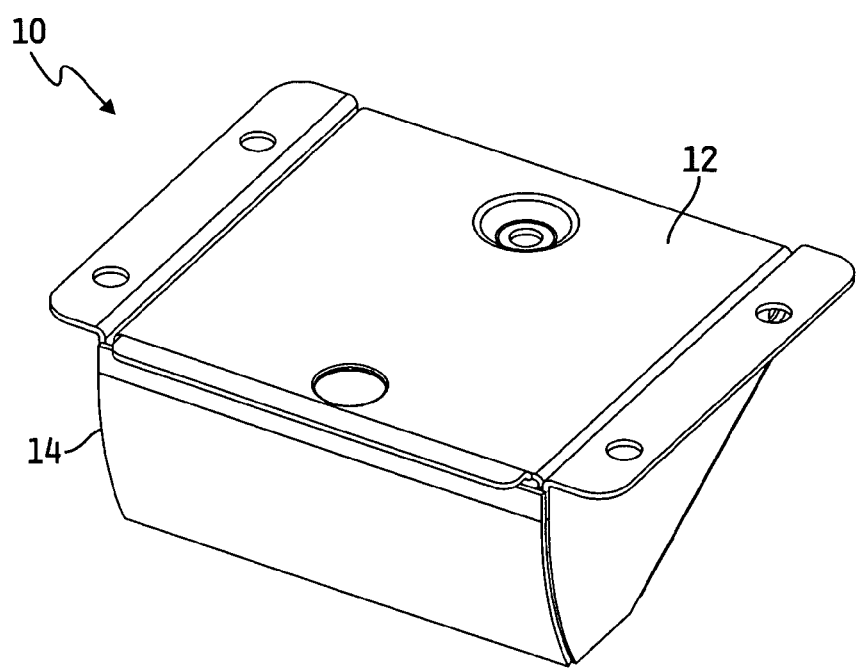
FIG. 3 is a perspective view of the illustrative housing assembly of FIG. 1 showing the storage cover in a closed position.

Illustratively, the storage lid or cover 12 and the storage chamber 14 are movably coupled together. For example and without limitation, one or more pins or bolts or a shaft, rod, dowel, or other suitable coupler that would couple together and allow relative movement of the cover 12 and chamber 14 may be passed through the respective and aligned mounting apertures 25, 25'. Other suitable couplings are also contemplated, such as for example a hinge. The storage lid or cover 12 can then move, rotate or pivot about an axis 26 defined through the coupler(s) and mounting apertures 25, 25' as depicted for example by arrow 27 in FIG. 2. The storage cover 12 may move about the axis 26 (FIG. 2) relative to the storage chamber 14 from a closed or stored position (FIG. 3) until the cover 12 is in the fully open or deployed position such that base wall 21 faces downwardly toward and is adjacent to the surface of the support structure in which the assembly is mounted, for example a floor or a wall, and the proximate end of the cover 12 is displaced away from the cavity or recess 15 toward the side of the axis 26 opposite from the storage chamber 14.

Figure 4:
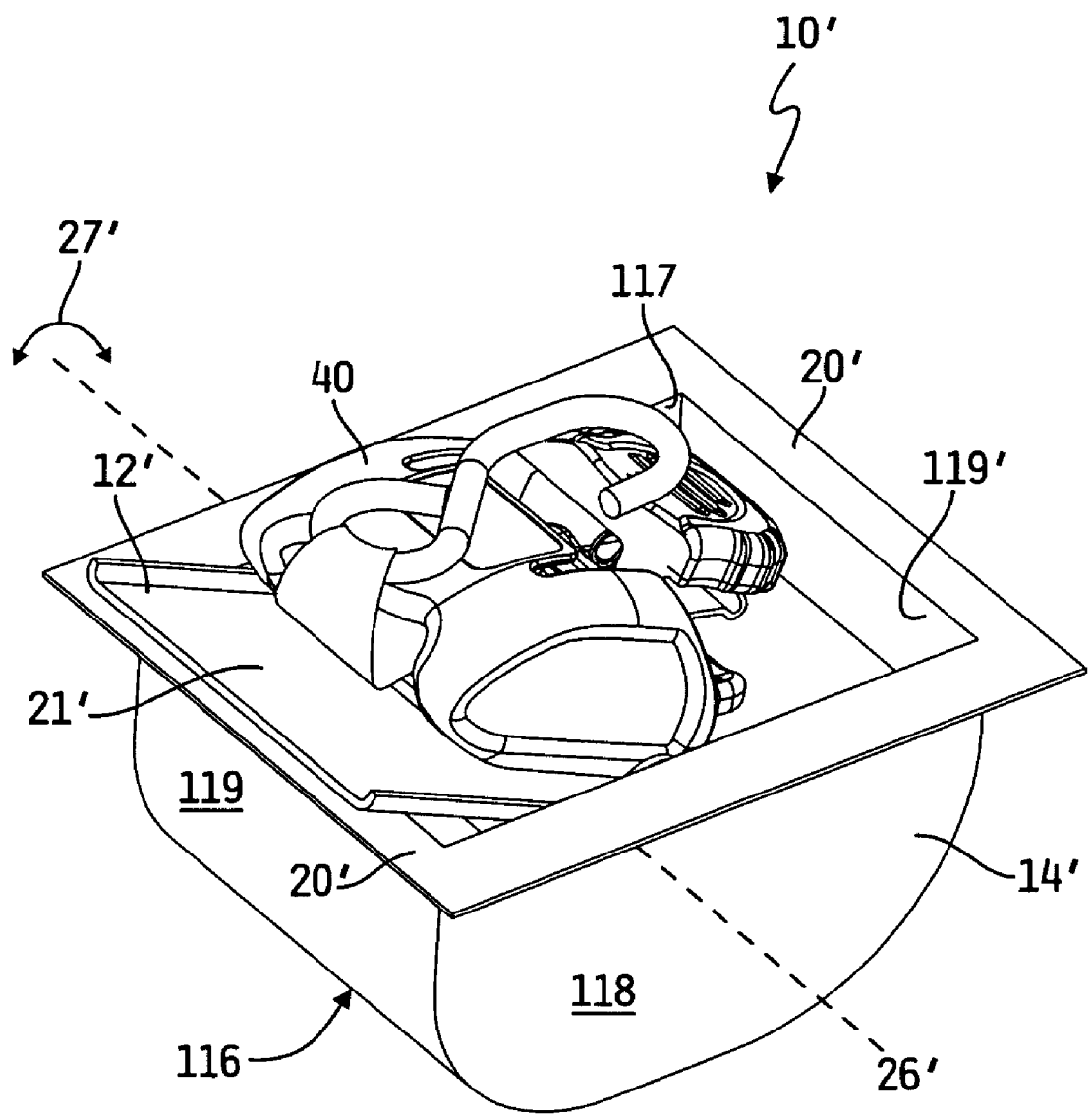
FIG. 4 is a perspective view of another illustrative housing assembly of showing the storage cover in a generally open position revealing a restraint device attached to the storage cover.

FIG. 4 depicts another illustrative housing assembly 10'. The housing assembly 10' comprises a storage cover 12' and a storage chamber 14'. The storage cover 12' has a pair opposing ends and a pair of opposing sides and generally comprises a generally square or rectangular plate or base wall 21'. One or more of the edges of the opposing sides of the storage cover 12' or base wall 21' may but need not be turned up as illustrated in FIG. 4. The cover 12' may also comprise one or more sidewalls or end or cross walls if desired. A mounting aperture 11 may be formed in the base wall 21' and may be configured to attach or mount a restraint device 40 to the storage cover 12'. The base wall 21' may also have a manipulator (not shown) for moving the cover or lid 12'. While the storage lid or cover 12' illustratively has a quadrilateral shape in plan view. It will be appreciated that any regular or irregular shape may be used.

Illustratively, the storage chamber 14' depicted in FIG. 4 generally comprises a pair of spaced-apart sidewalls 117, 118, a pair of spaced-apart end or cross walls 119, 119', and a base wall 116 extending therebetween. A storage cavity or recess is defined between the walls 116, 117, 118, 119, 119'. Illustratively, a flange or skirt 20' extends around the perimeter of the storage chamber 14'. Mounting apertures (not shown), may be formed in the skirt 20' and maybe configured to receive therethrough any suitable connector or coupler to mount the assembly 10' in a floor or wall or other support structure. Illustratively, the storage lid or cover 12' and the storage chamber 14' are movably coupled together. For example and without limitation, one or more pins or bolts or a shaft, rod, dowel, or other suitable coupler may be used to couple together and allow relative movement of the cover 12' and chamber 14'. Other suitable couplings are also contemplated. The storage lid or cover 12' can move, rotate or pivot about an axis 26' relative to the storage chamber as depicted for example by arrow 27' in FIG. 4. Illustratively, axis 26' is a transverse axis. The storage chamber is sized and shaped to receive therein the restraint device 40 and to allow the storage cover or lid 12' to move therein and relative thereto about axis 26'. In contrast to the embodiment of FIGS. 1-3, which moves about a transverse axis 26 positioned at one end of the housing assembly 10, the illustrative embodiment of FIG. 4 moves about a transverse axis 26' positioned generally at a point between the cross or end walls 119, 119' of the storage chamber 14'.

Figure 5:
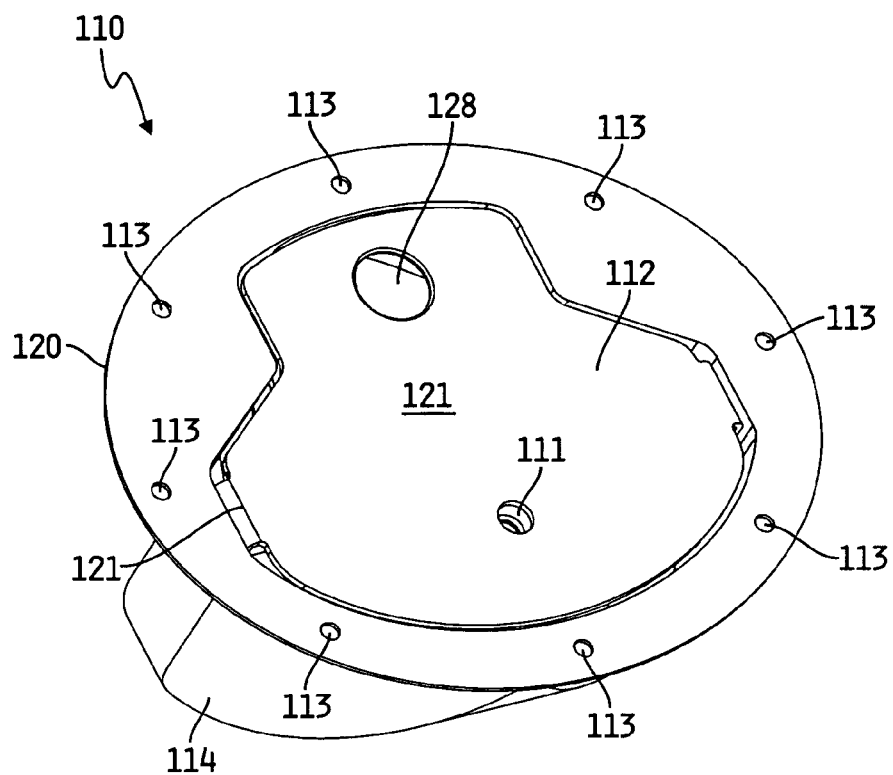
FIG. 5 is a perspective view of another illustrative housing assembly showing the storage cover in a closed position.
Figure 6:
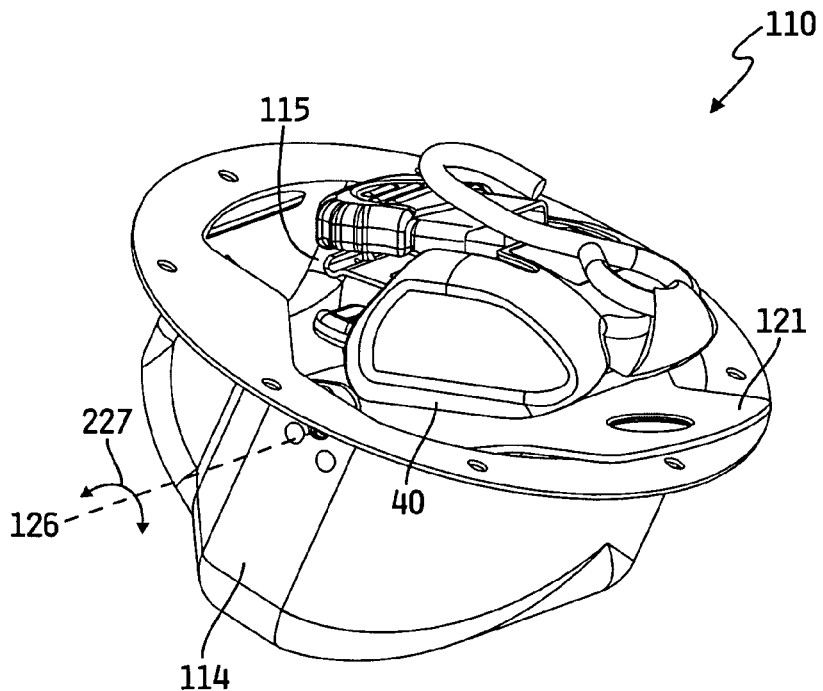
FIG. 6 is a perspective view of another illustrative housing assembly showing the storage cover in a generally open position revealing a restraint device attached to the storage cover.

FIGS. 5-6 depict yet another illustrative housing assembly 110. Housing assembly 110 illustratively has a generally pear shape in plan view; but, it will be appreciated that the housing assembly 110 may have any regular or irregular shape. The housing assembly 110 comprises a storage cover 112 and a storage chamber 114. The storage cover 112 generally comprises a generally pear-shaped plate or base wall 121. The cover 112 may but need not also comprise one or more sidewalls, end or cross walls, and/or turned-up lips or ridges if desired. A mounting aperture 111 may be formed in the cover 112 base wall or plate 121 and may be configured to attach or mount a restraint device 40 to the storage cover 112. The cover 112 or base plate 121 may also have a manipulator 128 at a proximate end of the cover 112 for moving the cover or lid 112.

Illustratively, the generally pear-shaped storage chamber 114 defines a storage cavity or recess 115 sized and shaped to receive therein a restraint device 40. Illustratively, a flange or skirt 120 extends around the perimeter of the storage chamber 114. Mounting apertures 113, may be formed in the skid 120 and may be configured to receive therethrough any suitable connector or coupler to mount the assembly 110 in a floor or wall or other structure. Illustratively, the storage lid or cover 112 and the storage chamber 114 are movably coupled together. Illustratively the cover 112 is movably mounted at a point between the manipulator 128 and the mounting aperture 111. It will be appreciated, however, that the cover 112 could be mounted near either its proximate end or distal end. Any suitable coupling may be used to mount together and allow relative movement of the cover 112 and the chamber 114. For example and without limitation, one or more pins or bolts or a shaft, rod, dowel, hinge or other suitable coupler may be used. The storage lid or cover 112 or plate 121 may move, rotate or pivot about an axis 126 relative to the chamber 114 as depicted for example by arrow 227 in FIG. 6. The storage chamber is sized and shaped to receive therein the restraint device 40 and to allow the storage cover or lid 112 to move about axis 126 therein and relative thereto.

Figure 7:
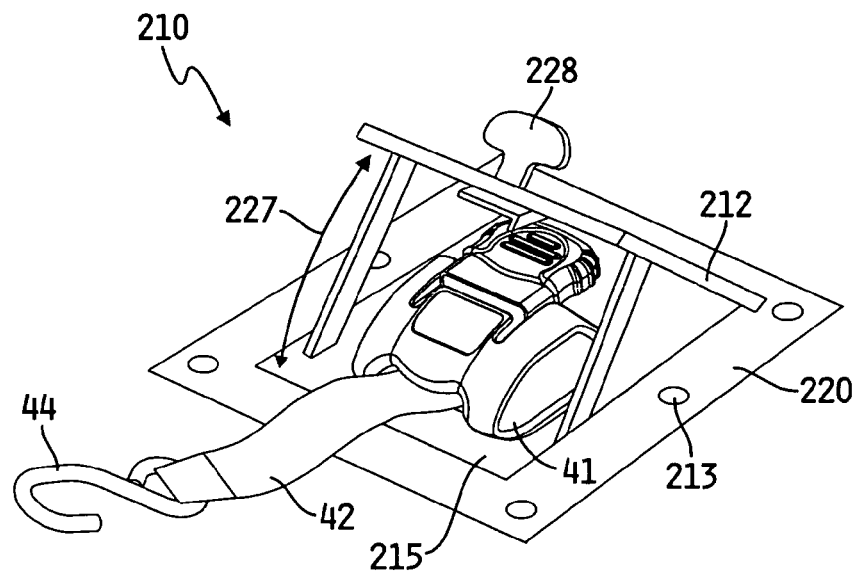
FIG. 7 is a perspective view of another illustrative housing assembly showing the storage cover in a generally open position and the housing assembly mounted in a structure such as a wall or a floor.
Figure 8:
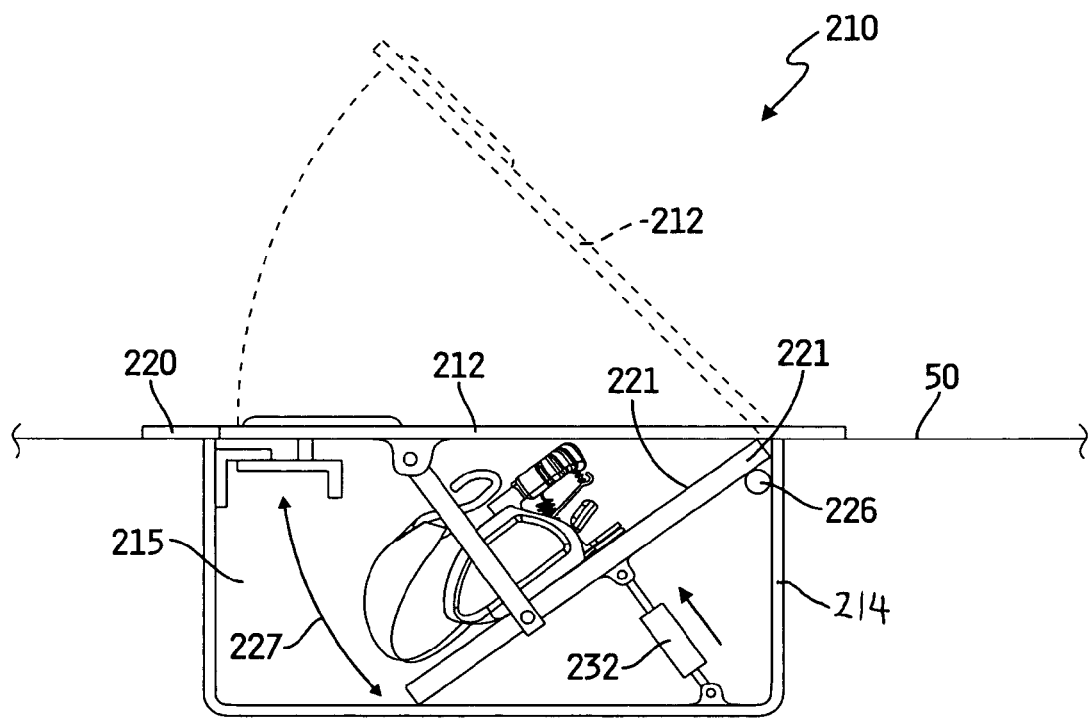
FIG. 8 is a cross section of the illustrative housing assembly of FIG. 7.

Referring to FIGS. 7-8, yet another illustrative housing assembly 210 is depicted. The housing assembly 210 comprises a storage cover 212 and a storage chamber 214. The storage cover 212 has a generally rectangular or square shape having opposing sides and opposing ends, although any shape can be used. The storage cover may have a handle or manipulator 228, which illustratively is positioned at the proximal end of the storage cover 212, which proximal end is opposite from the end that is mounted to the storage chamber 214. The manipulator 228 may be used to facilitate movement of the cover 212 relative to the storage chamber 214.

Illustratively, the storage chamber 214 is generally a parallelepiped having an open-ended top and forming a storage cavity or recess 215 between its spaced-apart side and end walls. It will be appreciated that any other suitable shape could be used. Illustratively, a flange or skirt 220 extends around the perimeter of the storage chamber 214 adjacent to the open-ended top. Mounting apertures 213, may be formed in the skirt 220 and may be configured to receive therethrough any suitable connector or coupler to mount the assembly 210 in a structure 50 such as for example a floor or wall. A restraint 40 is mounted to a separate mounting wall or plate 221, which illustratively is moveably mounted to the housing assembly 210.

Illustratively, the storage lid or cover 212 and the storage chamber 214 are movably coupled together. For example and without limitation, one or more pins or bolts or a shaft, rod, dowel, or other suitable coupler that would couple together and allow relative movement of the cover 212 and chamber 214 may be used. Other suitable movable couplings are also contemplated, such as for example a hinge. The storage lid or cover 212 may move, rotate or pivot relative to the chamber 214 about an axis 226 defined through the coupler(s) and as depicted for example by arrow 227 in FIG. 7. The mounting plate 221 and the storage chamber 214 may be moveably mounted together. Illustratively, mounting plate 221 may be mounted to the storage chamber 214 coincident and coaxially with or independent from the storage cover 212. In addition, the storage cover 212 and mounting plate 221 may move independently of or in concert with one another as desired. Such movement may or may not be co-axially. The mounting plate 221 may be moved relative to the chamber 214 about the axis 226 from a stored position in the storage recess 215 of the storage chamber to a deployed position manually or with the aid of a bias member. For example, the storage cover 212 may be coupled to the mounting plate 221 such that when the cover 212 is moved, as by applying a force to the manipulator 228, to an open position, the mounting plate also moves into a deployed position as shown in FIG. 7. The mounting plate may also be moved into the deployed position with the aid of a bias member 232. The bias member 232 may be any suitable device such as a spring or a hydraulic piston. It will be appreciated that the storage cover 212 could be of two-piece construction. For example, it could be split down the middle like a pair of double doors, with each side moveably coupled to its proximate side or edge of the storage chamber. The split halves of such a storage cover could lay open when the restraint device is in use, or could drop down into the recess.

Figure 9:
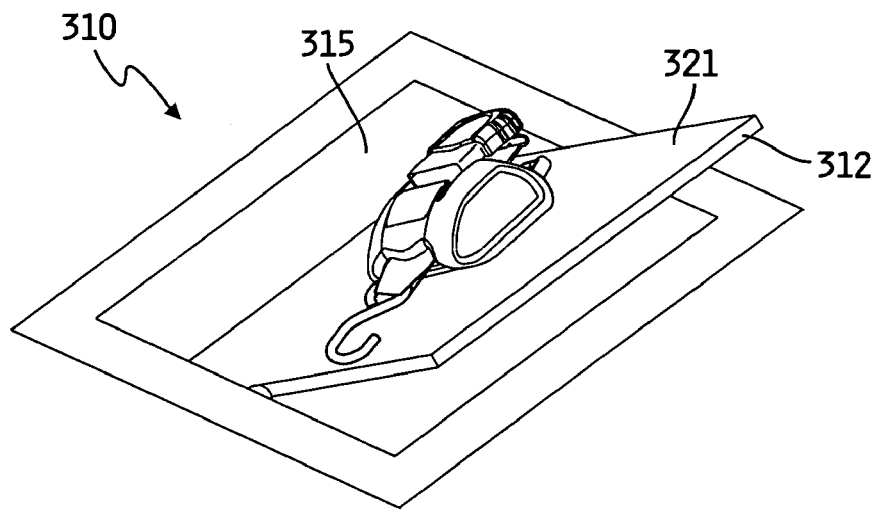
FIG. 9 is a perspective view of another illustrative housing assembly showing the storage cover in a generally open position and the housing assembly mounted in a structure such as a wall or a floor.
Figure 10:
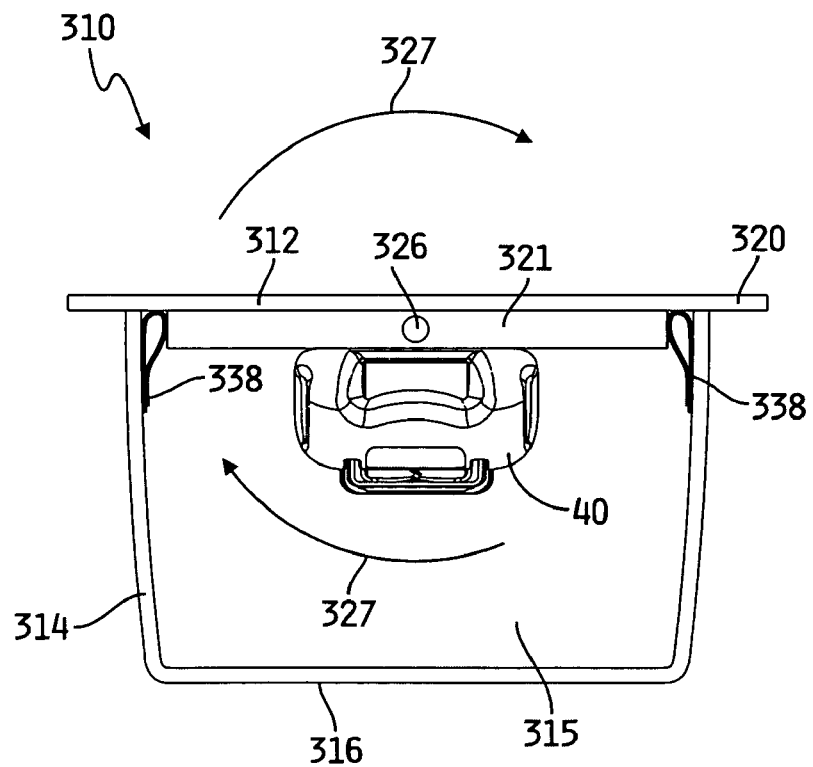
FIG. 10 is a cross section of the illustrative housing assembly of FIG. 9.

Another illustrative housing assembly 310 is depicted in FIGS. 9 and 10. The housing assembly 310 comprises a storage cover 312 and a storage chamber 314. The storage cover 312 comprises a mounting plate 321 which illustratively has a generally rectangular or square shape having opposing sides and opposing ends, although any shape can be used. The mounting plate 320 may but need not have a handle or manipulator (not shown). The manipulator may be used to facilitate movement of the cover 312 relative to the storage chamber 214.

Illustratively, the storage chamber 314 is generally a parallelepiped having an open-ended top and forming a storage cavity or recess 315 between its spaced-apart end walls, side walls and bottom wall 316. It will be appreciated that any other suitable shape could be used. Illustratively, a flange or skirt 320 extends around the perimeter of the storage chamber 314 adjacent to the open-end of the chamber 314. Mounting apertures may be formed in the skirt 320 and may be configured to receive therethrough any suitable connector or coupler to mount the assembly 310 in a structure 50 such as for example a floor or wall. A restraint 40 is mounted to cover 312 or mounting wall or plate 321, which illustratively is moveably mounted to the storage chamber 314. The storage lid or cover 312 or plate 321 can move, rotate or pivot relative to the chamber 314 about an axis 326 as depicted for example by arrow 327 in FIG. 10. Illustratively, axis 326 is a longitudinal axis, but it could be a transverse axis as in the case of axis 26 in FIG. 4. The axis 326 is positioned between the sidewalls of the storage chamber and extends longitudinally between the end walls. It will be appreciated that the storage cover 312 or mounting plate 321 could be moved by merely pushing on one side of the cover 312/plate 321 in order to move or flip the plate 321 about the axis 326 without the need of a manipulator. The storage chamber 314 is sized and shaped to receive therein the restraint device 40 and to allow the storage cover or lid 312 to move therein about axis 326.

In operation, the housing assembly 10, 10', 110, 210, 310 illustratively is mounted or recessed in a recess of a support structure 50 such as a frame, wall or a floor of a building, vehicle or other support structure using any suitable connector or coupler such as for example and without limitation a nail, bolt, rivet, screw, cement, glue, hook and loop, welding and the like. The recessed housing assembly will be generally flush with the surface of the support structure and the restraint device 40 may be received within the storage chamber such that the restraint device will be in a stored or stowed position inside the storage cavity of the storage chamber. Each of the storage cover, the mounting plate if present and/or the restraint device if necessary may be moved to an open or deployed position separately or in unison. For example, in the case where the restraint device is attached to the cover, the cover and restraint device will move to the deployed position simultaneously. In the case where the restraint device is attached to the mounting plate, the restraint device and the mounting plate will be moved to the deployed position simultaneously. In the case where the restraint device is attached to the mounting plate, which in turn is attached or coupled to the cover, then the restraint device, the mounting plate and the cover will be moved to the deployed position simultaneously. A bias member may be used to move the restraint device into the deployed position either by acting directly on the restraint device and/or by acting directly on the cover, and/or the mounting plate. The restraint device may for example and without limitation be a retractable tie-down assembly such as disclosed in U.S. Pat. No. 5,282,706, the disclosure of which is incorporated herein by reference. Another suitable example is disclosed in U.S. Pat. No. 5,625,973, the disclosure of which is incorporated herein by reference. Indeed, any retractor coupled with a flexible member and hook or other connector, coupling or attachment member may be used. For example, as seen in FIG. 7, an illustrative restraint device 40 may comprise a retractor device 41, with a flexible member or web 42 having one end coupled to the retractor and the other end coupled to a hook or connector 44. Once the restraint device 40 is in the deployed position, the flexible member may be wrapped around any item desired to be restrained, with the hook attached to a suitable anchor point on the side of the item opposite the side proximate to the housing assembly 10, 10', 110, 210, 310 in order to secure or restrain the item. The flexible member 42 could also be passed through a restraint member, such as a slot, on the item, rather than wrapped around the item. It will be appreciated that the cover may be moved to the open or deployed position and the restraint device may remain within the storage chamber and used to restrain an item by pulling the flexible member out of the chamber without moving the restraint device 40 out of the storage chamber. In such a case, the restraint device need not be attached to the cover or the mounting plate and the restraint device's deployed position will be within the storage chamber when the cover is moved to the open or deployed position.

The illustrative housing assemblies 10, 10', 110, 210, 310 can be made from any suitable material using any method of manufacture suitable for that material. Also, as noted, the housing assembly can be sized and shaped as desired. Any of the housing assemblies may be sealed with for example a rubber seal 338.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. This application is therefore intended to cover any variations, uses, or adaptations of the invention using its general principles. Further, this application is intended to cover such departures from the present disclosure as come within known or customary practice in the art to which this invention pertains.

What is claimed is:

1. A housing assembly comprising:
   a storage chamber configured to be mounted to a support structure;
   a restraint device configured to be received within the storage chamber, the restraint device having a web wound around a spool; and
   a cover that moves relative to the storage chamber, the restraint device attached to the cover,
   wherein the restraint device and the cover together move relative to the storage chamber from a stored position wherein the restraint device is received within the storage chamber and a deployed position wherein the restraint device is generally removed from within the storage chamber, and
   wherein the cover defines an axis therethrough that is positioned generally centrally between proximal and distal ends thereof and the restraint device and the cover together move about the axis between the stored position and the deployed position.

2. The housing assembly of claim 1 wherein the storage chamber is recessed within the support structure.

3. The housing assembly of claim 2 wherein the support structure comprises a floor.

4. The housing assembly of claim 2 wherein the support structure comprises a wall.

5. The housing assembly of claim 2 wherein the cover and the storage chamber are moveably coupled together.

6. A housing assembly comprising:
   a storage chamber configured to be recessed within a support structure, the storage chamber defining a cavity and having a mounting flange extending around a perimeter of the cavity adjacent to an open end thereof, the mounting flange configured to be mounted to the support structure;
   a cover coupled to the storage chamber and moveable relative thereto; and
   a restraint device attached to the cover and received within the storage chamber, the restraint device and cover being moveable together from a stored position generally within the storage chamber and a deployed position generally removed from within the storage chamber;
   wherein the restraint device comprises a retractable tie-down assembly having a web wound around a spool;
   wherein the mounting flange defines a planar surface, and wherein the cover defines a planar surface that is generally flush with the planar surface of the mounting flange when the cover is in the stored position.

7. The housing assembly of claim 6, wherein the mounting flange extends around the cover when the cover is in the stored position.

8. The housing assembly of claim 6, wherein the storage chamber defines an axis about which the restraint device is rotated when moved between the stored and deployed positions.

9. The housing assembly of claim 8, wherein the axis is positioned between distal and proximal ends of the storage chamber.

* * * * *